(12) United States Patent
Johnson et al.

(10) Patent No.: US 7,351,064 B2
(45) Date of Patent: Apr. 1, 2008

(54) QUESTION AND ANSWER DIALOGUE GENERATION FOR INTELLIGENT TUTORS

(76) Inventors: Benny G. Johnson, 3200 Daniel La. #302, Monroeville, PA (US) 15146; Dale A. Holder, P.O. Box 42, Russell Springs, KY (US) 42642

( * ) Notice: Subject to any disclaimer, the term of this patent is extended or adjusted under 35 U.S.C. 154(b) by 266 days.

(21) Appl. No.: 10/241,896

(22) Filed: Sep. 12, 2002

(65) Prior Publication Data

US 2003/0113699 A1    Jun. 19, 2003

Related U.S. Application Data

(60) Provisional application No. 60/322,080, filed on Sep. 14, 2001.

(51) Int. Cl.
  *G09B 11/00* (2006.01)
  *G06N 5/04* (2006.01)
(52) U.S. Cl. .................. 434/365; 434/323; 706/45
(58) Field of Classification Search ............ 434/322, 434/323, 350, 307 R, 365; 706/11–14, 45
See application file for complete search history.

(56) References Cited

U.S. PATENT DOCUMENTS

| | | | | |
|---|---|---|---|---|
| 4,847,784 A | * | 7/1989 | Clancey | 706/50 |
| 4,965,741 A | * | 10/1990 | Winchell et al. | 706/11 |
| 5,597,312 A | * | 1/1997 | Bloom et al. | 434/362 |
| 5,721,845 A | * | 2/1998 | James et al. | 715/841 |
| 5,779,486 A | * | 7/1998 | Ho et al. | 434/353 |
| 5,809,493 A | * | 9/1998 | Ahamed et al. | 706/52 |
| 6,807,535 B2 | * | 10/2004 | Goodkovsky | 706/3 |
| 2002/0127533 A1 | * | 9/2002 | Grant | 434/350 |
| 2004/0018477 A1 | * | 1/2004 | Olsen | 434/307 R |

* cited by examiner

*Primary Examiner*—Kathleen Mosser
(74) *Attorney, Agent, or Firm*—McKay & Associates, PC

(57) ABSTRACT

A question generation means is developed for intelligent tutors wherein a question menu having dynamic questions is capable of being displayed after each step of a problem. The generated question set contains both elementary and advanced questions and changes after each step is performed, thereby enhancing the potential that a student using the tutorial understands every aspect of a problem.

6 Claims, 3 Drawing Sheets

Equation Balancing Tutor

New Problem    Instructions    QUANTUM    Inspiring students to learn *why*

Let's learn to balance your equation $2\ Cu(NO_3)_2 \rightarrow 2\ CuO + 4\ NO_2 + O_2$ Next, I'll balance oxygen with one molecule of O2 on the products side.

We now have the same number of atoms of each element in the reactants and products, so the equation is balanced.

Ask a Question

What does the balanced equation tell me?
Interpret this equation for me in terms of mass.
Why didn't you consider the question above until after the equation was balanced?
Why did you write just "O2" instead of "1 O2" in the equation?
Could you also have taken 0 CuO to balance O?
Give me a more detailed explanation of the last step you took.
What are the conservation conditions for this equation?
Is the equation balanced yet?
Is N balanced?
Is O balanced?
Is Cu balanced?

Next Step ▶

Ask ?

FIG. 2

| | |
|---|---|
| Tutor: | Here is our equation:<br>$NH_3 + O_2 \rightarrow NO + H_2O$<br>I will show you how to balance it. |
| Student: | Show me the next step. |
| Tutor: | I put $NH_2 + O_2$ and $H_2O$ in the proportion required to balance hydrogen.<br>$2 NH_3 + O_2 \rightarrow NO + 3 H_2O$ |
| Student: | Show me the next step. |
| Tutor: | Next I'll take 2 molecules of nitrogen monoxide to balance nitrogen.<br>$2 NH_2 + O_2 \rightarrow 2 NO + 3 H_2O$ |
| Student: | Show me the next step. |
| Tutor: | I multiplied everything by 2. Multiplying by 2 doesn't balance or unbalance anything. It just sets up the equation to balance oxygen more easily.<br><br>$4 NH_3 + 2 O_2 \rightarrow 4 NO + 6 H_2O$ |
| (1) Student: | Why didn't you set the coefficient of $H_2O$ to zero to balance oxygen? |
| Tutor: | This might look like a good move since it gives 2 oxygen atoms on each side. However, writing $0 H_2O$ amounts to eliminating $H_2O$ from the equation. The original equation told us that water is involved in the reaction. That's why all the coefficients must be positive. |
| (2) Student: | How about taking – 1 NO to balance O instead? |
| Tutor: | Taking –1 NO might seem to balance oxygen mathematically, since it appears to give 2 O on each side, but the problem with writing this is that it doesn't have any physical meaning. You can't have negative numbers of molecules. Writing -1 nitrogen monoxide molecules would be like saying you have -1 pieces of candy. That's why chemical equations use only positive numbers. |
| Student: | Show me the next step. |
| Tutor: | I balanced oxygen by putting five $O_2$ on the reactants side.<br>$4 NH_3 + 5 O_2 \rightarrow 4 NO + 6 H_2O$<br>The equation is now correctly balanced. |
| (3) Student: | What does this balanced equation tell me? |
| Tutor: | It tells you that 4 moles of $NH_3$ plus 5 moles of $O_2$ will react to form 4 moles of NO plus 6 moles of $H_2O$. |
| (4) Student: | Interpret this equation for me in terms of mass. |
| Tutor: | The mass of the reactants is: $68.1216 g NH_3 + 159.9940 g O_2 = 228.1156 g$ of reactants. The mass of the products is: $120.0244 g NO + 108.0912 g H_2O = 228.1156 g$ of products. It should be no surprise that the products have exactly the same mass as the reactants. The atoms that formed the reactants were rearranged to form the products, but all of them are still there. |
| (5) Student: | Why didn't you consider the question above until after the equation was balanced? |
| Tutor: | Balancing the equation determines the quantitative relationship between the amounts of reactants and products. An unbalanced equation tells you what is in the reaction, but it cannot tell you how much. Only after the equation is correctly balanced can we make any connection between the amounts of reactants and products. |

FIG. 3

QUESTION AND ANSWER DIALOGUE GENERATION FOR INTELLIGENT TUTORS

SPECIFIC REFERENCE

The present invention claims priority of filing date established by provisional application Ser. No. 60/322,080, filed Sep. 14, 2001.

GOVERNMENT RIGHTS

This invention was made with the United States Government support under SBIR Grant No. DMI-0060379 from the National Science Foundation. The United States Government has certain rights in this invention.

BACKGROUND

1. Field of the Invention

The present invention relates generally to computer-implemented expert rules for artificial intelligence programs. In particular, a computerized method for generating questions applicable for intelligent tutorials is disclosed. In the present embodiment, a list of question-generating rules is added to an intelligent tutoring system, and the applicability of each rule in the list is tested upon every action that changes the state of the tutoring session. Students then using the tutorial are presented a menu of applicable questions that may be asked about each step taken, and accordingly ask at least one of the generated questions and get an answer. An intelligent tutoring system that is adapted to be enhanced by the present invention is that such computerized tutorial disclosed in U.S. patent application Ser. No. 09/769,910, now U.S. Pat. No. 6,540,520, the entire disclosure of which is herein incorporated by reference.

2. Description of the Related Art

Current tutoring programs routinely limit the problems and or questions available to the student to a fixed preset list, which rules out, for example, the possibility of providing tutoring on the teacher's own assignments. Typically, in non-intelligent tutorial software, the student only selects answers in multiple-choice form, and is told whether the selection is right or wrong. Several programs present a worked-out solution for study, but this does nothing to address the student's own mistake and the reasons behind them.

This has led to criticism of scripted "linear" instructional approaches that are too rigid and inflexible to support meaningful learning. There is a real need for a further dimension of interactivity. Fortunately, the approach used for constructing meaningful explanations, which is described by U.S. Pat. No. 6,540,520, is now taught. There now exists the opportunity for answering other useful questions about problems and their solutions. A way to leverage the benefit of the reasoning process of an artificial intelligence expert system is by exporting it in the form of various questions the system can answer. This can permit the student to ask questions about the situation even before they are ready to attempt the problems. Therefore, there is a need for a question-generating mechanism to be implemented into an expert system framework, wherein a student can ask dynamic, context-dependent questions about the problem or situation.

By interactively answering a variety of detailed questions for the student at each step, or at least providing that option, the particular pedagogical approach of the tutor is specifically oriented to help beginning and lower-performing students the most, who often cannot make any start on a problem, or do not feel comfortable attempting to do so. The ability of the tutor to answer questions makes it possible for students to conduct exploratory inquiry even before they can attempt the problems. At each step, questions are displayed in a menu the student can choose from as needed, selecting as many or as few questions as desired. Many different paths of inquiry are possible for the same problem, with the student directing the inquiry. The questions and answers are highly targeted and context-specific, changing at each step, and model good scientific thinking about the problem domain and underlying concepts. This is very important in fostering the development of the student's own self-explanation and question-asking abilities.

SUMMARY

Internally generated problem-solving information was used at each step of an externally supplied problem to construct a set of detailed questions the system can answer for the student, whereby one-on-one questions about the problem solving process may be address by the user. The problem can be accented from the student, an external program, or any other source. Generations of the questions was implemented in the expert system framework and when applicability conditions are met, an action is taken, wherein the action is the production of at least one question pertinent to the problem step or input. Question activation can be pedagogically based allowing for the possibility of assessment of whether a question is likely to be helpful or effective for the problem at hand, beyond simply whether the question is answerable.

Accordingly, the present invention generally is a computerized method for generating a question and answer dialogue for intelligent tutorials, comprising creating a question-generating rule class specific for a desired type of question (optionally from a base class), generating at least one question from said question-generating rule class provided an applicability condition is satisfied, and displaying said question in a user menu, wherein the user is permitted to direct an inquiry as to which question should be asked.

In operation then, in an intelligent tutor having a user interface including a display and a selection-device, a method for providing and selecting from a menu on said display is disclosed, wherein the method comprises retrieving a set of menu entries for the menu, each of the menu entries representing a question retrieved from a question-generating rule class; displaying the menu entries on the display; receiving a menu entry selection signal from the selection device pointing at one or more of the questions from the set of question-generating rules; and, in response to the signal, displaying an answer to the question, whereby a student using the intelligent tutor has directed an inquiry to a step of a problem.

BRIEF DESCRIPTION OF THE DRAWINGS

FIG. 2 shows an example of the user menu that presents the generated-questions.

FIG. 3 shows an example of the dialogue produced as the computer is working the problem after the student asks the questions to get the details of each step.

Figure 1:
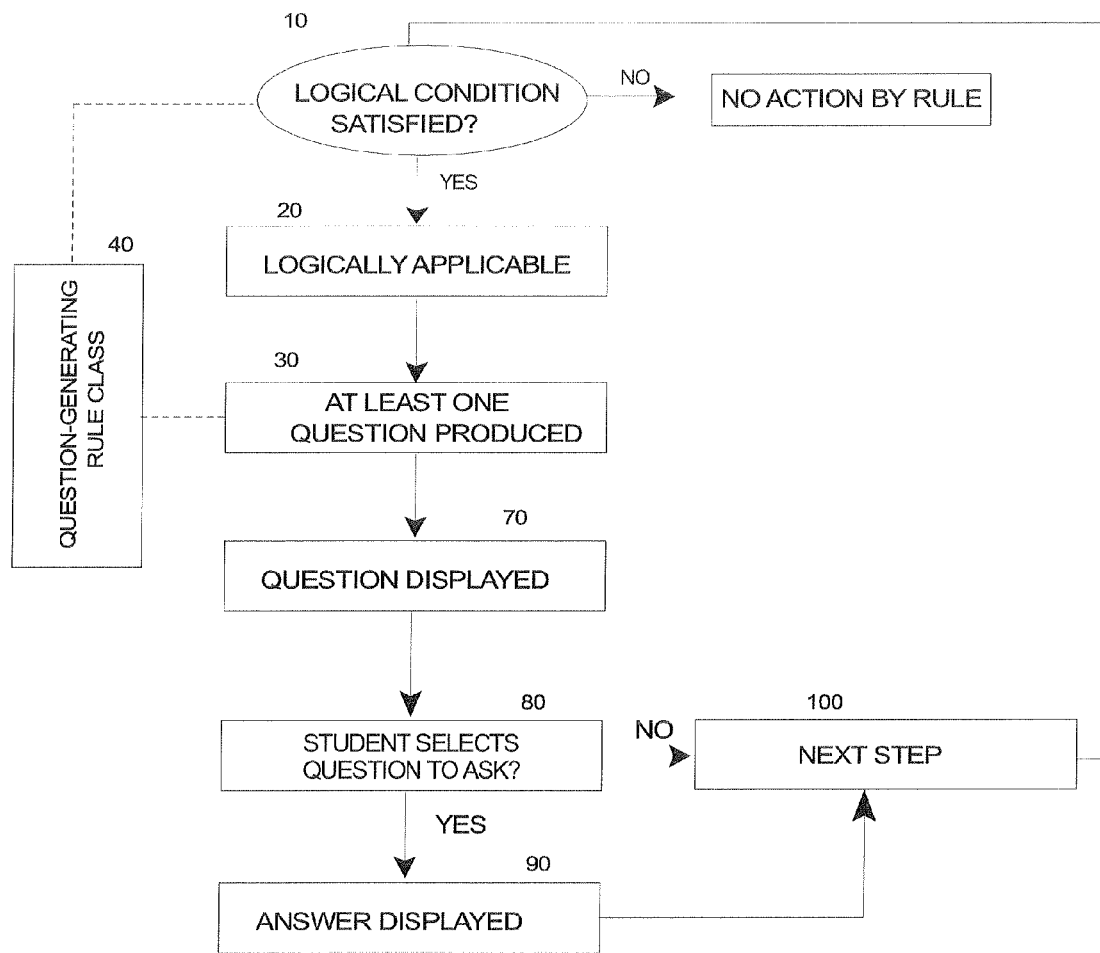
FIG. 1 is a flow diagram representing the program flow for generating a dynamic question set.

The flow charts represent the program or logic flow that can be implemented on computer readable media tangibly embodying the program of instructions executable by standard, general-purpose computers, or which can be implemented as specialized devices. The present invention is not limited as to the type of computer on which it runs. The computer-typically includes an input device such as a touchpad, mouse, and/or keyboard which may guide a selection device such as a pointer, and a display device such as a monitor. The computer also typically comprises a random access memory (RAM), a read only memory (ROM), a central processing unit (CPU), and a storage device such as a hard disk drive or a floppy disk drive. Embodied as computer-readable medium, the present methodology may reside in run-time medium such as the RAM or ROM, and in distribution media such as floppy disks, CD-ROMs, and hard disks capable of being executed by the computer or specialized device.

TERMS

Use of a "base class" as defined in the art is a common technique in the C++ programming language for specifying a common interface in this application for all of the rules. This technique is not central to the ability to implement the present methodology, thus other programming languages may be used.

"Consistency rules" refer to rules programmed to allow an educational response to an error even if an input is not anticipated or does not correspond to a specific misconception.

A "question-generating rule" is the rule that generates a question when an applicability condition is satisfied.

DETAILED DESCRIPTION OF THE PREFERRED EMBODIMENT

Operationally, question-and-answer (Q&A) capability can be implemented through a modified type of artificial intelligence (AI) rule used to generate the questions. In general, AI rules are typically programmed as logical implications:

If A then B.

Here A represents a logical proposition defined on the current state of the tutoring session, for example including but not limited to the steps taken on the problem by the student. If proposition A is true, the logical condition 10 is satisfied and the rule is said to be applicable 20. The implied action B can be carried out. In the present computerized methodology, a question-generating rule taken from a question-generating rule class 40 differs in its definition of the action B to be taken upon satisfaction of the applicability condition A. The differences of various rule types can be characterized as below in table 1:

TABLE 1

| Rule | Action |
| --- | --- |
| Production Rule | A next step in solving the problem is generated |
| Consistency Rule | A constraint imposed on the solution by a fundamental principle is evaluated |
| Question Rule | A question relevant to the current state of the tutoring session is generated |

While all three rule types assess applicability by examination of the current state, the applicability decision for question rules can also contain purely pedagogical considerations. Such conditions can be included as needed as part of the definition of the applicability condition A for the rule, thus generating or producing this question 30.

For example, in a chemistry tutor on balancing chemical equations, one reasonable question would concern how much of a certain product can be made from a given amount of a certain reactant. Though this question can always be answered from the balanced equation, for pedagogical considerations such as simplicity of illustration, it might be desirable that this question be generated only when there is a single reactant in the equation, in this case to avoid potential confusion or misconceptions involving the concept of limiting reagent which may be ancillary to the intended educational purpose of the question in this context.

In the present embodiment, a list of question-generating rules that make up the question-generating rule class 40 is added to the intelligent tutoring system, and the applicability or logical condition 10 of each rule in the list is tested upon every action that changes the state of the tutoring session, whereby a dynamic question set is implemented for the display 70 to the student. With use of the present computerized methodology, a student is permitted to direct the inquiry by selecting a question to ask 80 after the generation of the user menu shown in FIG. 2.

As shown, the questions are listed independently in a window, which window could be similar to a window found within a web page interface downloaded from a network such as the Internet. It should be understood that the questions generated by the rules can be assigned not only independently, but in categories (not shown), if desired. In this manner, the questions will be displayed in the user interface organized into these labeled categories. This is useful for presenting questions to the student organized according to the concepts studied, for example.

As can be seen, many different paths of inquiry are made possible for the same problem, and the system can answer questions and display the answer 90 with a thorough depth of coverage about its own work. The above menu is dynamic inasmuch as it is adapted to change after each input or next step performed 100. Operationally and in conjunction with the flow chart, the mechanisms behind the dynamic question generation are demonstrated by the below example 1.

EXAMPLE 1

Interface for creating question generating rule classes:
//Base class for question generating rules
class QuestionRule : public Proposition<MCFTProblemContext>{
//QuestionRule is a specific type of logical proposition
public:
std::vector<QandA> getQandA(const Context& C, const VariableMap& VM)
const; //Called to generate Q&A from current context information
private:
    virtual void implQandA(std::vector<QandA>& QA, const Context& C, const
VariableMap& VM) const = 0;//Private function implementing Q&A
generation for this rule-implementation of this function is different for
each rule
};
Various concrete question-generating classes can be created
with this interface as derived classes:
class HowManyAtomsQuestionRule : public QuestionRule {//Concrete
rule class for questions about how many atoms are in a chemical formula
private:
    bool implA(const Context& C) const; //Implementation of logical
applicability condition for this rule
    void implQandA(std::vector<QandA>& QA, const Context& C,
const      ?
VariableMap& VM) const; //Implementation of Q&A generation upon -continued

```
satisfaction of logical applicability condition
};
class FormulaMassQuestionRule public QuestionRule {//Concrete rule
class for questions about mass quantities associated with a chemical
formula
private:
    bool implA(const Context& C) const; //Implementation of logical
applicability condition for this rule
void implQandA(std::vector<QandA>& QA, const Context& C const
VariableMap& VM) const;
//Implementation of Q&A generation upon satisfaction of logical
applicability condition
};
After the question-generating rules are implemented, below is an
example of how they can be used:
        std::vector<smart_ptr<QuestionRule> > Rules; //Set up list of
        question-generating rules
        Rules.push_back(new HowManyAtomsQuestionRule);
        Rules.push_back(new FormulaMassQuestionRule);
        Rules.push_back(new PercentCompositionQuestionRule)
        Rules.push_back(new MoleConceptQuestionRule);
        Rules.push_back(new EmpiricalFormulaQuestionRule)
        . . .
        //After each user action, generate questions and answers
        for (int i = 0; i < Rules.size( ); ++i) //For each rule in the system
        if(Rules[i]->applies(P)) //If the rule is applicable to the current
        state of tutoring session
            QandA::Add(Rules[i]->getQandA(P,VM)); //Generate the
            appropriate questions and answers
```

A question relevant to the state of the tutoring session is generated from context-specific and pedagogical factors and displayed for consideration as the user works on each step with the intelligent tutor. In this way, instead of step generation as output for a user's input as is known for production rule implementation, the action in the present methodology is a question, adapted to have its own particular answer.

The code snippet above for question generation depicts the case of the question-generating rules in a stand-alone list. In addition, question-generating rules can also be incorporated as part of the implementation of the other AI rule types in the system (production rules and consistency rules, see table 1) as a means of augmenting and enhancing the actions of these rules with question-and-answer capability. For example, within a production rule a question rule can be used to generate questions that can be answered for the student about a step the expert system took, and in a buggy rule (a production rule used to model anticipated student errors) questions can be provided that allow students to follow up by asking the system in-depth questions about specific errors they have made.

FIG. 3 demonstrates the dialogue produced as output by the program after the above questions are generated and prompted for use by the student. The example problem shown for FIG. 3 is a problem involving the balancing of chemical equations. The present methodology is not limited to this particular type of problem and can be used, for example, with all content areas such as mathematical, measurement conversion, and ratio/proportion problems. The question generation adds to the depth of interaction between an intelligent tutor and the user by implementing this question-and-answer approach as an integral tool for asking both elementary and advanced questions during the learning process.

In conjunction with FIG. 3 then, the table 2 below addresses what the program is doing after either each input from the student is received or the tutor has presented its own step, and why this is important.

TABLE 2

| | |
|---|---|
| 1) | After balancing nitrogen, upon counting the oxygen atoms from left to right it might be thought that the two oxygen atoms from the two NO molecules "already" balance the two O atoms on the reactants side. Thus it might seem that oxygen can be successfully balanced by setting the coefficient of $H_2O$ to zero to eliminate the three "unnecessary" O atoms. The answer relates the interpretation of the notation to the representation of a definite chemical reaction, and directly connects to the meaning underlying the notation. |
| 2) | Another step that seems to balance oxygen is setting the coefficient of NO to −1. This answer underscores that atoms and molecules are physical entities and points out the implication of this on the solution. It also emphasizes that balancing chemical equations is more than just solving an algebra problem or puzzle. As in (1), it shows that the reason for positive coefficients is chemical, not mathematical. Such "why didn't you" questions provide a particularly powerful way to model good cognitive strategies. |
| 3) | This question gives a reminder of what the equation notation represents, and focuses attention on the chemical meaning, rather than on superficially manipulating symbols and numbers. |
| 4) | This directly illustrates the mass conservation concept on the student's own problem. The fact that seemingly unrelated numbers add up to the same value is compelling evidence that something must be at work. If the student does not yet understand why this happens, he or she is primed by this demonstration for the explanation that follows. An important point is that this is a good example of a question the student is not likely to think of on his/her own, yet is beneficial for study. |
| 5) | This question gives a timely reinforcement of why we would need to do this type of problem. |

The above examples show several useful attributes of the question-and-answer approach. It illustrates that many different paths of inquiry are made possible for the same problem, with the student leading the inquiry. In fact, the student can lead the inquiry even if the tutor itself is providing the step, instead of the student. This would be useful if the student does not know any steps that he or she can take in solving the problem, and they would rather watch the tutor perform the problem and ask questions as to why the steps are performed in such a manner.

We claim:

1. A computerized method for generating dialogue in an intelligent tutor, said method comprising:
    accepting an externally supplied problem from a student, wherein said problem is the student's own problem;
    receiving a step towards a solution to said problem as input;
    creating a question-generating rule class as a derived class for generating questions for selection by said student as a form of said input;
    providing a meaningful response to said input even when said input towards said solution to said problem is unanticipated, further comprising the step of:
    interfacing each of said question-generating rule, production rules to model anticipated errors and consistency rules to impose constraints on a solution to said problem;
    testing the applicability of said production rule, said consistency rule, and said question generating rule after each said input is received; and
    generating said question relevant to the state of said tutor from both context-specific and pedagogical factors to augment and enhance the actions of said production rule and said consistency rule such that different paths of inquiry are made possible for the same problem.

2. The method of claim 1, further comprising the step of displaying an answer to said question.

3. The method of claim 1, wherein said questions are organized into labeled categories.

4. A computer-readable medium having computer executable instructions for performing a method for generating dialogue in an intelligent tutor, said method comprising:
   accepting an externally supplied problem from a student, wherein said problem is the student's own problem;
   receiving a step towards a solution to said problem as input;
   creating a question-generating rule class as a derived class for generating questions for selection by said student as a form of said input;
   providing a meaningful response to said input even when said input towards said solution to said problem is unanticipated, further comprising the step of:
   interfacing each of said question-generating rule, production rules to model anticipated errors and consistency rules to impose constraints on a solution to said problem;
   testing the applicability of said production rule, said consistency rule, and said question generating rule after each said input is received; and
   generating said question relevant to the state of said tutor from both context-specific and pedagogical factors to augment and enhance the actions of said production rule and said consistency rule such that different paths of inquiry are made possible for the same problem.

5. The medium of claim 4, further comprising the step of displaying an answer to said question.

6. The medium of claim 4, wherein said questions are organized into labeled categories.

* * * * *